United States Patent Office 3,251,860
Patented May 17, 1966

3,251,860
OPTIONALLY 17 - ALKYLATED 17β - HYDROXY-4-OXA-5α-ANDROST-1-EN-3-ONES AND ESTERS THEREOF
Raphael Pappo, Skokie, and Christopher Jung, Morton Grove, Ill., assignors to G. D. Searle & Co., Chicago, Ill., a corporation of Delaware
No Drawing. Filed Sept. 14, 1962, Ser. No. 223,815
9 Claims. (Cl. 260—343.2)

The present invention is concerned with novel organic compounds of the steroid class in which the usual cycloaliphatic A-ring has been replaced by an oxygen-containing heterocyclic lactone ring structure. These compounds are particularly described as optionally 17-alkylated 17β-hydroxy-4-oxa-5α-androst-1-en-3-ones and the corresponding esters, and are represented by the structural formula

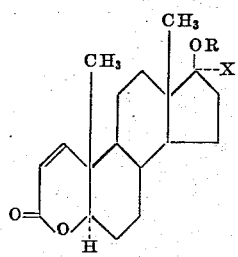

where R is selected from the group consisting of hydrogen and lower alkanoyl radicals, and X is selected from the group consisting of hydrogen and lower alkyl radicals.

The lower alkanoyl radicals represented by R are typified by formyl, acetyl, propionyl, butyryl, valeryl, caproyl, and the branched-chain isomers thereof, while the X term is symbolic of lower alkyl radicals such as methyl, ethyl, propyl, butyl, pentyl, hexyl, and the branched-chain radicals isomeric therewith.

The compounds of the present invention can be manufactured from starting materials of the structural formula

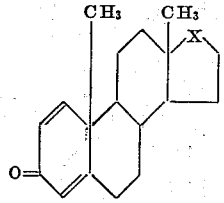

wherein X is a carbonyl or α-(lower alkyl)-β-hydroxymethylene group. The reaction of a representative starting material with an hydroxylating mixture, such as an alkali metal chlorate in the presence of osmium tetroxide, results in the corresponding 4,5-diol. Cleavage of that diol with a suitable reagent, as for example lead tetracetate, affords the related 5-oxo-3,5-seco-A-norandrost-1-en-3-oic acid. The latter substance is allowed to react in a suitable reducing medium such as aqueous alkali containing sodium borohydride to afford the 4-oxa-5α-androst-1-en-3-one of the present invention. A specific sequence of reactions to illustrate the latter processes is the hydroxylation of 17β-hydroxy-17α-methylandrosta-1,4-dien-3-one with potassium chlorate and osmium tetroxide to afford 4α,5α,17β-trihydroxy-17α-methylandrost-1-en-3-one, followed by cleavage of that triol with lead tetracetate in aqueous acetic acid, resulting in 17β-hydroxy-17α-methyl-5-oxo-3,5-seco-A-norandrost-1-en-3-oic acid, and finally the reduction of that keto-acid with sodium borohydride in aqueous sodium hydroxide to produce 17β-hydroxy-17α-methyl - 4 - oxa-5α-androst-1-en-3-one.

The 17β-(lower alkanoyl)oxy compounds of this invention are obtained from the aforementioned 17β-hydroxy compounds by reaction with a suitable acylating agent such as a lower alkanoic acid anhydride or a lower alkanoyl halide, preferably in the presence of a suitable acid acceptor such as pyridine or triethylamine. As a specific example, the aforementioned 17β-hydroxy-4-oxa-5α-androst-1-en-3-one is contacted with propionic anhydride and pyridine at room temperature to afford 17β-hydroxy-4-oxa-5α-androst-1-en-3-one 17 - propionate. The corresponding esters carrying a 17-alkyl substituent are produced by an analogous procedure, preferably conducted at an elevated temperature.

The compounds of the present invention display valuable pharmacological properties. They are, for example, hormonal agents as is evidenced by their androgenic properties. In addition, they are antibiotic agents in consequence of their ability to inhibit monocotyledenous seed germination.

This invention will appear more fully from the examples which follow. These examples are given by way of illustration only and are not to be construed as limiting the invention either in spirit or in scope. Temperatures are given in degrees centigrade (° C.), and quantities of materials in parts by weight unless otherwise noted.

*Example 1*

To a solution of 50 parts of androsta-1,4-diene-3,17-dione in 546 parts of tertiary-butyl alcohol is added successively 700 parts of water, 9 parts of potassium chlorate, and 4.5 parts of osmium tetroxide. This reaction mixture is stored at room temperature for about 15 days, then is partially concentrated at reduced pressure. The residual mixture is kept at 0–5° for about 16 hours, and the clear aqueous supernatant layer is separated by decantation, then is extracted with benzene. The benzene solution is washed successively with 5% aqueous sodium hydroxide and water, then is dried over anhydrous sodium sulfate and concentrated at reduced pressure to afford a crystalline residue. Successive recrystallization from benzene and isopropyl alcohol affords 4α,5α-dihydroxy-androst-1-ene-3,17-dione, melting at about 205–209°.

A mixture of 2 parts of 4α,5α-dihydroxyandrost-1-ene-3,17-dione, 8.35 parts of lead tetracetate, 36.8 parts of acetic acid, and 6 parts of water is stirred at 50–60° for about 1½ hours, then is cooled, diluted with water, and extracted with benzene. The organic solution is washed successively with 5% aqueous potassium bicarbonate and water, then is dried over anhydrous sodium sulfate and concentrated to dryness at reduced pressure. The solid residue is triturated with benzene to afford 5,17-dioxo-seco-A-norandrost-1-en-3-oic acid, which substance melts at about 234–238°. This compound is represented by the structural formula

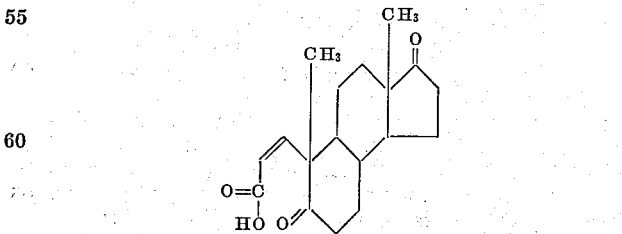

*Example 2*

To a solution of 5 parts of 5,17-dioxo-3,5-seco-A-norandrost-1-en-3-oic acid in 500 parts of water containing 0.6 part of sodium hydroxide is added 5 parts of sodium borohydride, and the resulting reaction mixture is kept at room temperature for about 16 hours, then is acidified to pH 2 by the addition of hydrochloric acid. This acidic mixture is then extracted with chloroform, and the chloroform layer is separated, washed successively with 5% aqueous sodium hydroxide and water, dried over anhydrous sodium sulfate and stripped of solvent at reduced pressure. The crystalline residue is recrystallized from benzene to afford 17β-hydroxy-4-oxa-5α-androst-1-en-3-one, melting at about 178.5–180.5° and characterized also by the structural formula

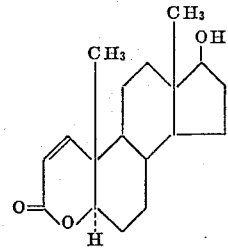

Example 3

To a solution of 50 parts of 17β-hydroxy-17α-methylandrosta-1,4-dien-3-one in 546 parts of tertiarybutyl alcohol containing 700 parts of water is added successively 8.5 parts of potassium chlorate and 4.25 parts of osmium tetroxide. The reaction mixture is kept at room temperature for about 7 days, then is concentrated at reduced pressure to afford a dark-colored residual oil. This oil is extracted with chloroform, and the chloroform layer is washed successively with 5% aqueous sodium hydroxide and water, then is dried over anhydrous sodium sulfate and evaporated to dryness at reduced pressure. The resulting residue is recrystallized first from ether then from isopropyl alcohol to yield 4α,5α,17β-trihydroxy-17α-methylandrost-1-en-3-one, melting at about 196–199°.

To a solution of 4.127 parts of 4α,5α,17β-trihydroxy-17α-methylandrost-1-en-3-one in 78 parts of acetic acid containing 8.3 parts of water is added 17.21 parts of lead tetracetate, and the resulting reaction mixture is heated at 65° for about 1½ hours. The reaction mixture is then cooled, diluted with water, and extracted with chloroform. The organic layer is separated and washed with dilute aqueous sodium hydroxide, then is cooled and allowed to stand, during which time the product crystallizes. This crysetalline material is collected by filtration, then dried to yield 17β-hydroxy-17α-methyl-5-oxo-3,5-seco-A-norandrost-1-en-3-oic acid, melting at about 223–225° and characterized also by the structural formula

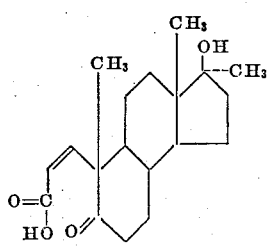

Example 4

A mixture of 3 parts of 17β-hydroxy-17α-methyl-5-oxo-3,5-seco-A-norandrost-1-en-3 - oic acid, 63 parts of chloroform, 3 parts of sodium borohydride, and 42 parts of water is stirred at room temperature for about 4 hours. The aqueous layer is separated and acidified by the addition of hydrochloric acid, then is allowed to stand at room temperature for several minutes, and is finally extracted with chloroform. The chloroform solution is washed successively with dilute aqueous potassium carbonate and water, then is dried over anhydrous sodium sulfate and stripped of solvent at reduced pressure. The crystalline residue is recrystallized first from benzene, then from ethyl acetate to afford pure 17β-hydroxy-17α-methyl-4-oxa-5α-androst-1 - en - 3 - one, melting at about 191–195°. This compound is represented by the structural formula

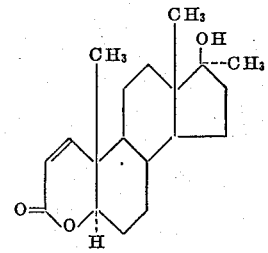

Example 5

The substitution of 52.3 parts of 17α-ethyl-17β-hydroxyandrosta-1,4-dien-3-one in the procedure of Example 3 results in 17α-ethyl-17β-hydroxy-5-oxo-3,5-seco-A-norandrost-1-en-3-oic acid.

Example 6

By substituting 4.31 parts of 17α-ethyl-17β-hydroxy-5-oxo-3,5-seco-A-norandrost-1-en-3-oic acid and otherwise proceeding according to the processes described in Example 4, 17α-ethyl-17β-hydroxy-4-oxa-5α-androst-1-en-3-one is obtained.

Example 7

A mixture of 5 parts of 17β-hydroxy-4-oxa-5α-androst-1-en-3-one, 7 parts of propionic anhydride, and 15 parts of pyridine is stored at room temperature for about 16 hours, then is cooled and treated with a small quantity of water. After standing at room temperature for about 3 hours longer, this mixture is further diluted with water, then is extracted with chloroform. The organic layer is separated, washed successively with water, dilute hydrochloric acid, water, and aqueous potassium carbonate, then is dried over anhydrous sodium sulfate and concentrated to dryness at reduced pressure. The resultnig solid residue is crystallized from methylcyclohexane to afford 17β-hydroxy-4-oxa-5α-androst-1-en-3-one 17 - propionate, melting at about 135–137°. This compound is represented by the structural formula

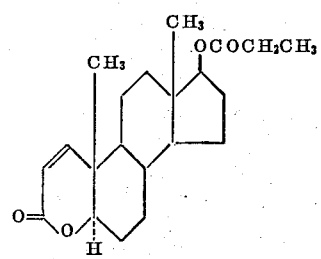

Example 8

The substitution of 5.5 parts of acetic anhydride in the procedure of Example 7 results in 17β-hydroxy-4-oxa-5α-androst-1-en-3-one 17-acetate of the structural formula

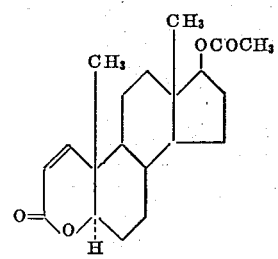

What is claimed is:
1. A compound of the structural formula

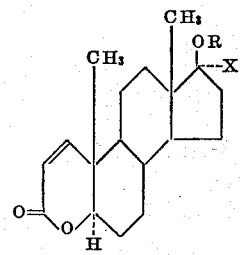

wherein X is selected from the group consisting of hydrogen and lower alkyl radicals defined by the formula $C_nH_{2n+1}$ wherein $n$ is a positive integer less than 8, R is hydrogen when X is a lower alkyl radical defined by the formula $C_nH_{2n+1}$ $n$ being a positive integer less than 8, and R is selected from the group consisting of hydrogen and radicals of the formula

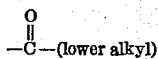

when X is hydrogen.

2. 17β-hydroxy-4-oxa-5α-androst-1-en-3-one.
3. A compound of the structural formula

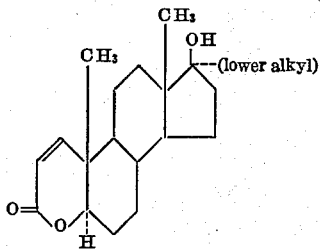

4. 17β-hydroxy-17α-methyl-4-oxa-5α-androst-1-en-3-one.

5. A compound of the structural formula

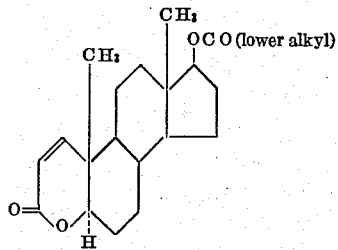

6. 17β-hydroxy-4-oxa-5α-androst-1-en-3-one 17-propionate.

7. A compound of the structural formula

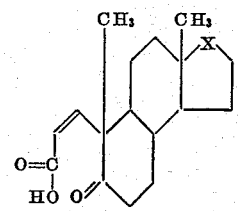

wherein X is selected from the group consisting of carbonyl and radicals of the formula

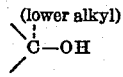

8. 5,17-dioxo-3,5-seco-A-norandrost-1-en-3-oic acid.
9. 17β-hydroxy-17α-methyl-5-oxo-3,5-seco-A-norandrost-1-en-3-oic acid.

References Cited by the Examiner
UNITED STATES PATENTS 2,973,370   2/1961   Atwater _____ 260—343.2

IRVING MARCUS, *Primary Examiner.*

DUVAL T. McCUTCHEN, *Examiner.*